Dec. 28, 1926.  
E. DANNER  
1,612,419  
METHOD AND APPARATUS FOR MAKING REENFORCED SHEET GLASS  
Filed August 23, 1920  2 Sheets-Sheet 1
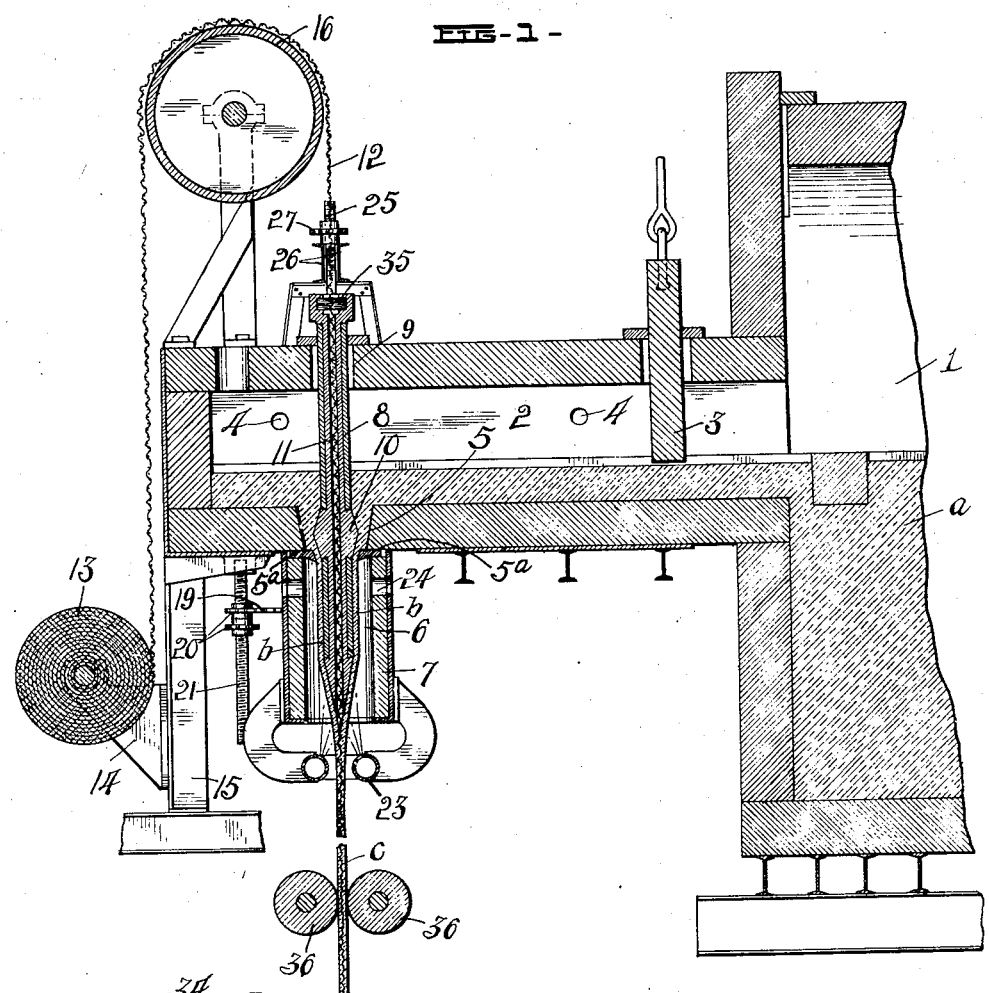
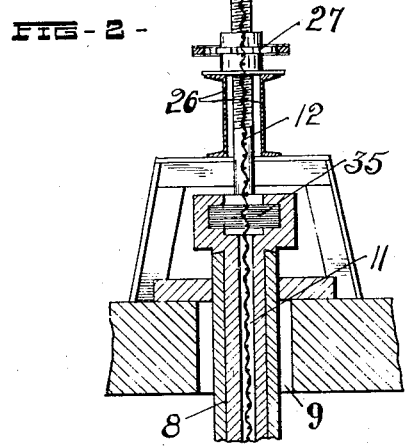
INVENTOR  
Edward Danner  
By Owen Owen & Crampton  
His attys.

Dec. 28, 1926.
E. DANNER
1,612,419
METHOD AND APPARATUS FOR MAKING REENFORCED SHEET GLASS
Filed August 23, 1920    2 Sheets-Sheet 2
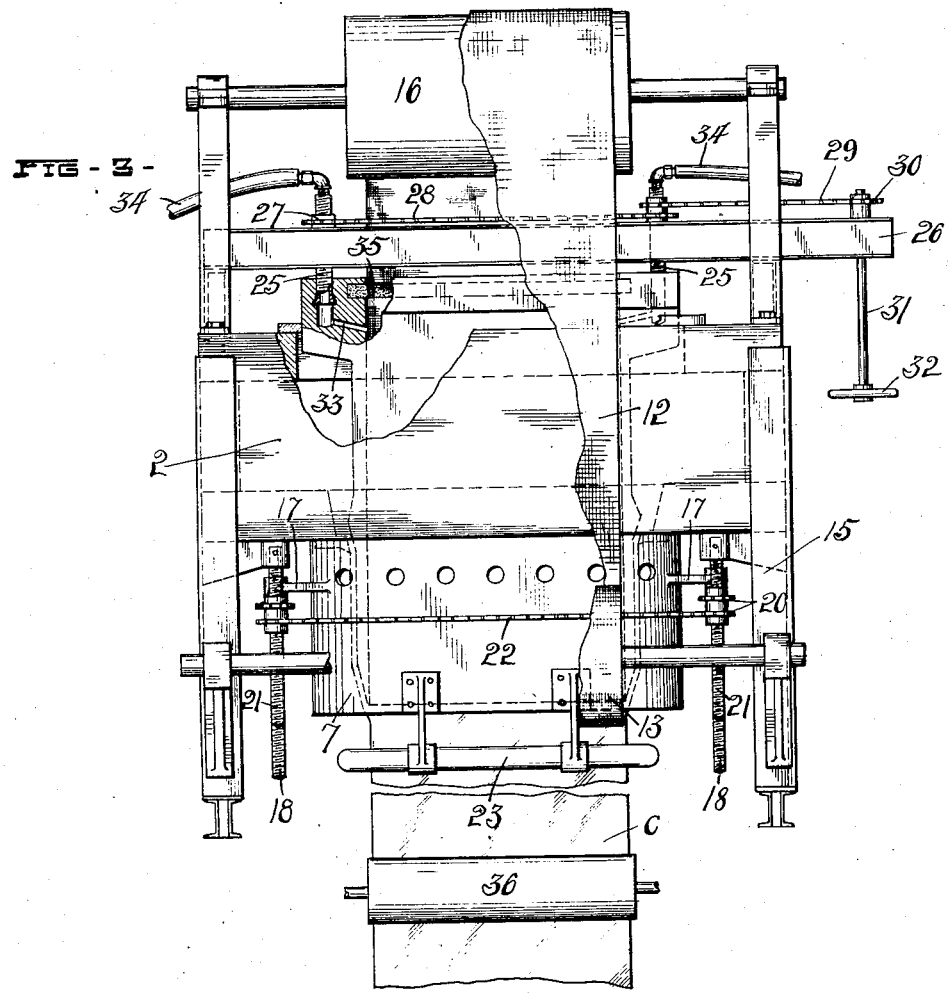
INVENTOR
Edward Danner.
By Owen Owen & Crampton.
His attys.

Patented Dec. 28, 1926.

1,612,419

UNITED STATES PATENT OFFICE.

EDWARD DANNER, OF DETROIT, MICHIGAN.

METHOD AND APPARATUS FOR MAKING REENFORCED SHEET GLASS.

Application filed August 23, 1920. Serial No. 405,321.

This invention relates to the manufacture of sheet glass and particularly to that of the type which is reenforced by imbedding a wire mesh therein, and the invention has for its object the provision of a simple and efficient method and means for producing such glass in a rapid, economical and commercially practical manner.

The invention is fully described in the following specification, and while, in its broader aspect, it is capable of embodiment in numerous forms, a preferred embodiment thereof is illustrated in the accompanying drawings, in which,—

Figure 1 is a fragmentary longitudinal, vertical section of an apparatus embodying the invention. Fig. 2 is an enlarged fragmentary view similar to Fig. 1, of a portion of the apparatus, and Fig. 3 is an outer end elevation of the apparatus with parts broken away.

Referring to the drawings, 1 designates a tank or chamber containing molten glass $a$ and from which the glass flows into a refining tank or chamber 2, preferably of shallow form and separated at its rear end from the tank 1 by a gate 3 adapted to be raised and lowered and to act as a cut-off gate to the supply of glass to the chamber 2 and also to separate the upper portions of the two chambers from each other to permit separate regulation of the temperatures therein. The chambers are heated by gas or in any other controllable manner well understood in the art, burner receiving openings 4 being provided, in the present instance, in the side walls of the chamber 2 for such purpose.

The chamber 2 is provided in its bottom with a discharge opening 5 for the glass, which opening for sheet glass drawing is of narrow elongated slot form of slightly greater length than the width of the sheet to be formed, and opens at its bottom into the upper end of a tempering chamber 6 substantially corresponding in shape to the opening 5 and formed by a shell 7 open at its bottom.

A slab 8 is projected through an opening 9 in the top of the chamber 2 down into said chamber, through the bottom discharge opening 5 thereof and into the tempering chamber 6, being flat in form and of less size in cross-section than the opening 5 and chamber 6 to provide a surrounding space between it and the walls of the opening and of the tempering chamber. The slab is vertically adjustable as hereinafter described and is provided within the opening 5 or upper end portion of the chamber 6 with a part 10 forming a downward and inward taper entirely around the slab to coact with a surrounding wall, plate or flange $5^a$ to enlarge or restrict the thickness of the space between the part 10 and flange as the slab may be raised or lowered. The plate or flange $5^a$ is preferably composed of a suitable metal, such as nichrome, adapted to withstand the high temperature and corrosive action of molten glass, and is clamped in a removable manner between the upper ends of the shell 7 and lower marginal edge wall of the opening 5 to permit a removal and replacement of the plate when desired. The lower end of the slab 8, which terminates within or adjacent to the lower end of the chamber 6 is tapered downwardly and inwardly at both sides to a narrow bottom edge so that glass films $b$ flowing down opposite sides of the slab may merge into a single sheet $c$ at the lower or discharge end of the slab, as illustrated.

The slab is provided longitudinally therethrough with an opening 11 corresponding in cross-sectional shape to that of the slab but smaller than the same to permit the feeding of a wire mesh or other suitable reenforcement 12 therethrough and into the sheet $c$ between the merging films $b$ thereof, so that the wire mesh or reenforcing means 12 is supplied in the present instance from a roll 13 removably mounted on brackets 14 secured to the frame 15, the wire mesh extending up from the roll over a guide drum 16 which is mounted over the chamber 2 in position for the wire to feed therefrom down into and through the slab 8.

The shell 7 forming the tempering chamber 6 is preferably vertically adjustable with respect to the slab 8 and bottom of the chamber 2 and for this purpose is provided at each end with a bracket arm 17 through which extends a rod 18 rigidly projecting downward from the bottom of the chamber 2. A sprocket-wheel (not shown) is threaded on each rod 18 in supporting relation to the respective arm 17 and is connected by a sprocket-chain 19 to one member of a double sprocket-wheel 20 threaded on a vertical rod 21 at one side of the rod 18. The other members of the sprocket-wheels 20, 20 are connected by a sprocket-chain 22. It is thus evident that a movement of the chain 22 will effect a simultaneous and uniform vertical adjustment of the sprocket-wheels on the rods 18 and a corresponding raising or lowering of the shell 7. One advantage of mounting the shell 7 for vertical adjustment is to facilitate a replacing of the plate or flange 5ª, which forms the restricted bottom of the discharge opening 5.

The chamber 6 is heated by flames from a burner 23 surrounding the sheet c at the lower end of the shell, whereby the temperature of said chamber may be regulated to impart the desired tempering condition to the glass as it flows downward from the slab and discharges therefrom. The flames are preferably directed against the outer surfaces of the glass so as to have a fire finishing action thereon. The shell is provided with exit openings 24 at its upper end for the flames from the burners.

The slab 8 has a threaded stem 25 extending upward from each end thereof through a pair of spaced cross frame beams 26, and a sprocket-wheel 27 is threaded on each stem above said beams and has its hub resting on the beams to serve as an adjustable support for the stem. The two sprocket-wheels 27 are connected by a sprocket-chain 28 to cause the wheels to have adjustment in unison, and one sprocket-wheel is provided on the hub thereof with a second sprocket-wheel that is connected by a chain 29 to a sprocket-wheel 30 on a vertical shaft or rod 31. This shaft is journaled between the beams 26 at one end thereof and carries a hand-wheel 32 at its lower end to facilitate adjustment. It is evident that a turning of the hand-wheel 32 will effect a raising or lowering of the slab.

Each stem 25 is hollow and has its lower end in communication with the slab passageway 11 below the upper end thereof through a passageway 33. The outer end of each stem is connected by a tube 34 to a pump or other means for effecting an exhaust of air from the slab passageway 11. The outer end of the passageway 11 is closed quite effectively against the admission of air thereto around the wire mesh 12, in the present instance, by a brush construction 35, which surrounds the wire mesh and preferably has wire bristles in impinging contact therewith. While this means may not entirely exclude the admission of air to the passageway 11 through its outer end, it serves very materially to do so and forms quite an effective closure for the outer end of the slab passageway, which closure at the same time is of a nature to permit the passage of the wire mesh 12 therethrough. The exhaust of air from the slab passageway 11 performs a double function, namely, of preventing air passing between the films or layers of the sheet with the wire mesh and forming bubbles in the sheet, and also of causing a sucking in of the soft glass closely into the meshes of the reenforced means as such means and the glass films b merge together and unite to form the reenforced sheet c at the discharge end of the slab.

The feeding means for the wire mesh comprises a pair of rolls 36, which coact with opposite sides of the sheet c preferably after it has become sufficiently hardened not to be surface marred by the rolls. The speed of feeding of the rolls is in conformance to the speed of flow of the glass from the slab so that there will be no stretching action of the glass after the engagement of the wire mesh therewith.

It is evident that I have provided a simple and efficient method and apparatus for forming reenforced sheet glass, the thickness of the sheet being regulated by the thickness of the films permitted to flow down the opposite sides thereof; that the liability of air bubbles occurring in the sheet by reason of air being drawn into the same with the wire mesh is reduced to a minimum, and that the glass is sucked or drawn into close engagement with the wire mesh by such action instead of by the use of pressing rolls heretofore commonly used. It will be understood, however, that such rolls may be used if desired. The glass which flows down the edge portions of the slab and connects the films at the opposite sides thereof merges into the edge portions of the sheet as the same is formed.

I wish it understood that my invention is not limited to the particular method described or to the apparatus illustrated for practicing the same, as numerous modifications and changes may be made therein without departing from the spirit of the claims.

Having thus described my invention, what I claim as new and desire to secure by Letters Patent, is,—

1. The method of forming reenforced sheet glass, consisting in flowing molten glass down opposite sides of a directing member in the presence of heat, merging the glass at the discharge end of the member and flowing it therefrom in single sheet form, and passing a reenforcing means through the member and introducing it into the forming sheet between the merging portions thereof.

2. The method of forming reenforced sheet glass, consisting in flowing molten glass in film form down opposite sides of a directing member in contact therewith and in the presence of heat, merging the films at the discharge end of the member and flowing them therefrom in single sheet form, and introducing a wire mesh through the directing member and into the sheet between the merging films.

3. The method of forming reenforced sheet glass, consisting in flowing molten glass in film form and in the presence of heat down opposite sides of a slab in contact therewith, which slab tapers to a narrow edge at the discharge end and has a passage longitudinally therethrough, the films merging at the discharge end of the slab and flowing therefrom in single sheet form, and continuously feeding a wire mesh down through the slab and between the merging films.

4. The method of forming reenforced sheet glass, consisting in freely flowing molten glass in film form down opposite sides of a directing member having a passage therethrough, merging the glass at the discharge end of the member and flowing therefrom in single sheet form, passing a reenforcing means through the member and into the forming sheet between the merging portions thereof and creating a suction within the member passageway to exhaust air therefrom.

5. The method of forming reenforced sheet glass, consisting in flowing molten glass down opposite sides of a directing member, exposing the glass to heat during such flow, merging the glass at the discharge end of the member and flowing it therefrom in single sheet form, passing a wire mesh through the directing member and into the forming sheet between the merging portions thereof and exhausting air from the interior of the directing member to prevent the presence of air bubbles in the sheet between the merging portions thereof and to draw the glass closely into the meshes of the reenforcing wire.

6. The method of forming reenforced sheet glass which consists in flowing downwardly a plurality of films of glass in the plastic state, passing downward between the films a reenforcing element, and uniting said films and reenforcing element into one integral sheet by gaseous pressure against the faces of the films which form the external faces of the finished sheet, without contacting such external faces with solid material until they are sufficiently set to avoid marring.

7. The method of forming reenforced sheet glass which consists in flowing downwardly from a source of molten glass two sheets of plastic glass in substantially parallel relation, passing downward between these sheets a reenforcing element and uniting said sheets and reenforcing element into one integral sheet by gaseous pressure against the distant faces of said sheets.

8. The method of forming reenforced sheet glass which consists in flowing downwardly a plurality of films of glass in the plastic state, passing downward between films a reenforcing element, governing the downward passage of said sheets by frictional contact with their adjacent faces while leaving their external faces free from contact with solid material and uniting said sheets and reenforcing element into one integral sheet by gaseous pressure against the external faces of said sheets.

9. The method of forming reenforced sheet glass which consists in flowing downwardly two films of glass in a plastic state, causing there to be greater gaseous pressure against the distant faces of the films than between the films, passing a reenforcing element downwardly between the films, maintaining the separation of the films for a distance by contact of their inner faces with solid material, and then allowing the excess external pressure to unite the films and the reenforce into one integral sheet.

10. The method of forming reenforced sheet glass which consists in flowing downwardly two films of glass in a plastic state, causing there to be greater gaseous pressure against the distant faces of the films than between the films, passing a reenforcing element downwardly between the films, maintaining the separation of the films for a distance by contact of their inner faces with solid material, then allowing the excess external pressure to unite the films and the reenforce into one integral sheet, and governing the temperature of the films while in their separated relation so that they are properly tempered when united.

11. In an apparatus of the class described, a chamber containing molten glass and having a discharge opening, a slab projecting down through the opening and adapted to have films of glass flow down opposite sides thereof from the chamber and to merge and flow in single sheet form from the lower end of the slab, and means for tempering glass flowing down the slab, the slab having a passageway longitudinally therethrough for the passage of a reenforcing means into the forming sheet.

12. In an apparatus of the class described, a chamber containing molten glass and having a discharge opening, a slab projecting down through the opening and adapted to have films of glass flow down opposite sides thereof by gravity and to merge and flow in single sheet form from the lower end thereof, and means for tempering the glass flowing down the slab, the slab being adjustable to cooperate with the opening walls to regulate the thickness of the films flowing down the slab and having a passageway longitudinally therethrough for the passage of a reenforcing means into the forming sheet.

13. In an apparatus for forming reenforced sheet glass, a directing member down opposite sides of which glass flows in film form with the films merging at the discharge end of the member and flowing therefrom in single sheet form, the directing member having a passageway longitudinally therethrough through which a reenforcing means may pass and enter the forming sheet between the portions thereof, the passageway being substantially closed at its outer end around a reenforcing means feeding into the same, said passageway being connected to a suction source.

14. In an apparatus of the class described, a chamber having a transversely elongated opening in its bottom from which molten glass may flow from a source of supply, a slab projecting down through said opening cooperating with the wall thereof to permit films of glass of predetermined thickness to flow down opposite sides of the slab, which films merge at the discharge end of the slab and flow therefrom in single sheet form, means forming a tempering chamber around the slab without the discharge opening, the slab being hollow to permit the passage of a wire mesh therethrough and into the forming sheet, means at the outer end of the slab passageway to substantially close the same around the wire mesh feeding therein, and connection between the slab passageway and exhaust source to exhaust air from the passageway.

15. In an apparatus of the class described, means forming a chamber having an opening therein through which molten glass may flow from a source of supply, a slab projecting through and below said opening with its sides in spaced relation to the side walls thereof to permit glass to flow in regulated film form down opposite sides of the slab and to merge and flow from the discharge end thereof in single sheet form, the slab having a passageway longitudinally therethrough in communication with an air exhaust means, and means at the outer end of the passageway for substantially closing the same and permitting the feeding of a reenforcing member therein.

16. In an apparatus of the class described, means forming a source of molten glass supply and a tempering chamber in communication at its upper end with the source of supply, a slab projecting into the tempering chamber in position to have glass flow down opposite sides thereof from the source of supply through said chamber and then merge and flow in single sheet form from the lower end of the slab, the slab being provided longitudinally therethrough with a passageway to permit the feeding of a reenforcing wire mesh therethrough and into the forming sheet at the discharge end of the slab, the passageway being substantially closed at its outer end around a wire mesh feeding therein and having communication with an air exhausting means.

17. In an apparatus of the class described, means forming a source of molten glass supply and a tempering chamber in communication at its upper end with a source of supply, a slab projecting into the tempering chamber and in position to have glass from the source of supply flow down the opposite sides thereof through said chamber and to merge and flow in single sheet form from the lower end of the slab, the slab being provided with a longitudinal passageway therethrough, means to feed a reenforcing element through said passageway and into the forming sheet, means including wire brushes contacting the reenforcing element at the entrance end of the passageway to substantially seal the passageway against external air, and means for exhausting air from the passageway.

18. The method of making wire-glass, by drawing a sheet of wire mesh downwardly, and flowing a stream of molten glass evenly and continuously onto each face of the wire mesh, the outer faces of the streams which form the sheet surfaces remaining at all times out of contact with any solid bodies.

19. The method of making wire glass which consists in forming two streams of molten glass and flowing them by gravity, moving a sheet of wire mesh downwardly between said streams and flowing said streams onto the opposite faces of the wire mesh and uniting the streams and wire mesh to form a sheet, the outer faces of the streams, which form the sheet surfaces, remaining out of contact with any solid body from the time they are formed until the sheet is set.

20. The method of forming reenforced sheet glass, consisting in flowing by gravity a plurality of streams of molten glass, merging the streams together while still molten to form a single sheet, exposing the outer surfaces of the separate streams to heated gases, and introducing a reenforcing means into the forming sheet between the merging portions thereof.

21. The method of forming reenforced sheet glass, consisting in flowing by gravity a plurality of streams of molten glass, merging the streams together while still molten to form a single sheet, exposing the outer surfaces of the separate streams to heated gases, introducing a reenforcing means into the forming sheet between the merging portions thereof, and creating a vacuum between the streams at the point of merging.

22. The method of forming reenforced sheet glass, consisting in flowing two separate streams of glass by gravity, moving a reenforcing element down between said streams, and uniting the two streams and reenforcing element in one sheet.

23. The method of forming reenforced sheet glass, consisting in flowing two separate streams of glass by gravity, moving a reenforcing element downward between said streams, uniting the two streams and reenforcing element in one sheet, and tempering the streams as they flow from their source to the place where they are united to form the sheet.

24. The method of forming reenforced sheet glass, consisting in forming two separate streams of molten glass, flowing said streams by gravity, moving a reenforcing element downward between said streams, uniting the two streams and reenforcing element in one sheet, and contacting the outer faces of the streams after their formation and until they are merged in one sheet by gases only.

25. The method of forming reenforced sheet glass, consisting in forming two separate streams of molten glass, moving a reenforcing element downward between said streams, flowing said streams from their places of formation by gravity onto the opposite faces of the moving reenforcing element, and uniting the streams and element in one sheet, conducting the formed sheet away from the point of union and contacting the outer faces of the streams and the surfaces of the sheet with gases only from the point of formation of the streams to the place where the sheet is set.

26. In an apparatus for forming reenforced sheet glass, a container for molten glass having a slot in its bottom, and a slab passing through the slot and adapted to receive a film of glass on each side thereof, which films flow down and from the lower end of the slab in merging relation, said slab extending downward below the floor of the container and upward above the normal level of the glass in the container and having a lengthwise opening therethrough for the passage of a reenforcement into the merging films.

27. In an apparatus for forming reenforced sheet glass, a container for molten glass having a slot in its bottom, and a slab extending through the slot and substantially dividing the glass in the container on one side of the slot from that on the other side thereof and extending downward beneath the bottom of the container, said slab having a longitudinal passage therethrough for a sheet reenforcement.

28. In an apparatus for forming reenforced sheet glass, a forehearth for molten glass from a source of supply and having a slotted roof and a slotted floor, a slab extending through said slots and projecting beneath the floor of the forehearth and being of less width than the slot to permit molten glass to flow from the forehearth down opposite sides of the slab and in single sheet form from the lower end thereof, said slab having a longitudinal opening therethrough for the passage of a reenforcement into the sheet as it leaves the slab.

29. In an apparatus for forming reenforced sheet glass, a container for molten glass having a slot in its roof and a slot in its floor, and a slab extending through said slots and projecting beneath the floor of the container, the slab being of less width than the slot to permit the flow of molten glass from the container down opposite sides of the slab and in merged sheet form from the lower end thereof, the slab also forming a guide means for a reenforcing material which feeds from the top of the container along the slab and enters the formed sheet at the point of merging of the portions of glass flowing down opposite sides of the slab.

30. In an apparatus for forming reenforced sheet glass, a container for molten glass having a slot in its roof and a slot in its floor, a slab extending through the slots and suspended from the roof of the container, said slab being of less width than the floor slot and forming a guide for the flow of glass in film form down opposite sides thereof and to a point of merging of the films in single sheet form at the lower end of the slab, and also forming a guide for a reenforcement which enters the formed sheet at the point of merging of the films.

31. In an apparatus for forming reenforced sheet glass, a container for molten glass having slots in its roof and floor, a slab extending down through said slots and beneath the floor of the container, said slab being vertically adjustable and having a portion adapted to seat in the floor slot to close the same and to provide regulable glass discharge openings through the slot at opposite sides of the slab upon an adjustment thereof, said slab also having a longitudinal passage therethrough, and means without the container for feeding a sheet reinforcement through the slab.

32. In an apparatus for forming reenforced sheet glass, a container for molten glass having slots in its roof and floor, a slab extending down through said slots and beneath the floor of the container, said slab being vertically adjustable and having a portion adapted to seat in the floor slot to close the same and to provide regulable glass discharge openings through the slot at opposite sides of the slab upon an adjustment thereof, said slab also having a longitudinal passage therethrough, means without the container for feeding a sheet reenforcement through the slab, and means without the container for vertically adjusting the slab.

33. A process of making wire glass which consists in melting and fining a bath of glass to constitute a source of supply, continuously flowing two ribbons of glass from said source of supply under the same head pressure, so that they converge and meet, feeding a metallic mesh between the ribbons and applying pressure to the outer faces of the ribbons after they meet to cause them to weld together with the metallic mesh imbedded therebetween.

34. The method of making wire glass by drawing a sheet of wire mesh downwardly and flowing a stream of molten glass evenly and continuously onto each face of the wire mesh, the outer faces of the streams which form the sheet surfaces remaining out of contact with any solid bodies until partially set.

In testimony whereof I have hereunto signed my name to this specification.

EDWARD DANNER.